United States Patent
Feng

(10) Patent No.: US 11,267,022 B2
(45) Date of Patent: Mar. 8, 2022

(54) POSITIVE AND NEGATIVE WIND PRESSURE AUTOMATIC CLEANING METHOD FOR OPTICAL DEVICE

(71) Applicant: NANJING TURBINE POWER CONTROL CO., LTD, Jiangsu (CN)

(72) Inventor: Jiansheng Feng, Jiangsu (CN)

(73) Assignee: NANJING TURBINE POWER CONTROL CO., LTD, Jiangsu (CN)

(*) Notice: Subject to any disclaimer, the term of this patent is extended or adjusted under 35 U.S.C. 154(b) by 0 days.

(21) Appl. No.: 17/252,051

(22) PCT Filed: Mar. 14, 2019

(86) PCT No.: PCT/CN2019/078111
§ 371 (c)(1),
(2) Date: Dec. 14, 2020

(87) PCT Pub. No.: WO2020/001075
PCT Pub. Date: Jan. 2, 2020

(65) Prior Publication Data
US 2021/0178433 A1    Jun. 17, 2021

(30) Foreign Application Priority Data

Jun. 27, 2018 (CN) .......................... 201810677583.X

(51) Int. Cl.
*B08B 5/02* (2006.01)
*B08B 5/04* (2006.01)
*G02B 27/00* (2006.01)

(52) U.S. Cl.
CPC .................. *B08B 5/02* (2013.01); *B08B 5/04* (2013.01); *G02B 27/0006* (2013.01)

(58) Field of Classification Search
None
See application file for complete search history.

(56) References Cited

U.S. PATENT DOCUMENTS

2006/0096622 A1* 5/2006 Lee .......................... B08B 15/02
134/94.1

FOREIGN PATENT DOCUMENTS

| CN | 201020463 Y | 2/2008 |
|---|---|---|
| CN | 201020463 Y | 2/2008 |
| CN | 102861684 A | 1/2013 |
| CN | 102861684 A | 1/2013 |
| CN | 203321383 U | 12/2013 |
| CN | 203321383 U | 12/2013 |
| CN | 104190682 A | 12/2014 |
| CN | 104190682 A | 12/2014 |
| CN | 206730758 U | 12/2017 |
| CN | 206730758 U | 12/2017 |

(Continued)

*Primary Examiner* — Eric W Golightly
(74) *Attorney, Agent, or Firm* — Muncy, Geissler, Olds & Lowe, P.C.

(57) ABSTRACT

The invention discloses a positive and negative wind pressure automatic cleaning method for an optical device and belongs to the field of generator rotors. The invention discloses a positive and negative wind pressure automatic cleaning method for an optical device, which utilizes fast-flowing air in a parallel direction to form alternating positive and negative wind pressure on the surface of the optical device in a pit structure of a rotatory component to cause dust particle vibration to realize automatic cleaning.

5 Claims, 3 Drawing Sheets

(56) References Cited

FOREIGN PATENT DOCUMENTS

| | | |
|---|---|---|
| CN | 108856153 A | 12/2018 |
| JP | 2013022532 A | 2/2013 |

* cited by examiner

POSITIVE AND NEGATIVE WIND PRESSURE AUTOMATIC CLEANING METHOD FOR OPTICAL DEVICE

TECHNICAL FIELD

The invention relates to the field of generator rotors, in particular to a positive and negative wind pressure automatic cleaning method for the optical device.

BACKGROUND ART

The optical device in the wireless rotary generator rotor grounding detection apparatus is easy to pollute in the long-term use process, and the detection precision is influenced. Because of different structures, at present, the cleaning method for a similar structure is mostly a manual cleaning method, namely periodically cleaning, or a plane transparent cover being installed on the surface to block dust and prevent dust accumulation on the surface of the optical device. But on one hand, the method increases the complexity of the structure and on the other hand the dust accumulation on the cover cannot be automatically cleaned such that when the time is long, the accuracy and the sensitivity of the detection of the optical device are still influenced. Only regular shutdowns and manual cleaning methods can be used.

SUMMARY OF THE INVENTION

To solve the above technical problem, the invention provides a positive and negative wind pressure automatic cleaning method for an optical device, which can realize automatic cleaning of the optical device at the end of a rotor.

To realize the technical scheme, the invention adopts the following technical scheme.

A positive and negative wind pressure automatic cleaning method for an optical device is disclosed, wherein an optical device positioned in a pit structure at an end of a rotor is positioned in an air inlet duct, when a generator rotor rotates a fan positioned on the generator rotor continuously sends airflow into the air inlet duct, and a rotation plane of the end of the rotor is parallel to a flow direction of the airflow;

when the airflow passes through the edge of the pit structure at the end of the rotor, a jet effect is formed; due to the entrainment of the jet, the air which is still on the leeside is carried away by the entrainment; along with the addition of new air, the jet boundary diffuses outwards in the pit structure, forming one approximately triangular negative pressure area; the edge of the jet boundary diffuses to the top plane of the optical device; air in an area outside the jet boundary in the pit structure is carried away by the entrainment to form a relative negative pressure area, and the area inside the jet boundary is a relative positive pressure area;

when the rotor rotates at a high speed, for the same optical device, the high speed alternately exists in a negative pressure area and a positive pressure area; a force direction of dust particles on a surface of the optical device continuously and alternately changes positively and negatively at high speed, so that the dust particles are caused to vibrate and are carried away by the airflow, thereby realizing automatic cleaning.

According to a further technical scheme, the wind temperature, the wind direction, the air volume and the wind speed of the air inlet duct are stable, and parallel stable airflow is formed.

According to a further technical scheme, the optical device is positioned in the pit structure at the end of the rotor, and the top of the edge of the pit structure is higher than the top of the optical device.

According to a further technical scheme, when an airflow velocity v is 6 m/s≤v≤15 m/s, a pit structure depth H, a pit structure diameter L and a distance h between the edge of the pit structure and an optical device plane should meet the following conditions: H≥h and H≥0.0932 L, 0.055L≤h≤0.284L.

According to a further technical scheme, infrared rays or visible rays of the optical device are emitted outwards from the end along the central axis direction.

Beneficial Effects

Compared with the prior art, the invention has the following remarkable advantages.

1. According to the invention, automatic cleaning of the surface of the optical element and device is realized, and the problems that the rotor grounding detection precision, sensitivity and reliability are influenced due to dust accumulation are solved.

2. For the original accumulated dust or dust particles on the surface of the optical device, repeated high-speed vibration can loosen the adhesion of the accumulated dust or dust particles, and the accumulated dust or dust particles can be more easily carried away by the wind.

3. For new dust particles coming along with wind, the surfaces of the new dust particles are under a force in alternating positive and negative directions, so that the new dust particles are less easily attached to the surface of an element, and the surface is kept clean for a long time.

4. According to the invention, a transparent or semi-transparent casing is not needed so that the loss of light on the casing is reduced. The utilization rate of an optical signal is improved, the loss power of an optical device is reduced, the service life of the optical device is prolonged, and the sensitivity and the reliability of rotor grounding detection are increased.

Figure 1:
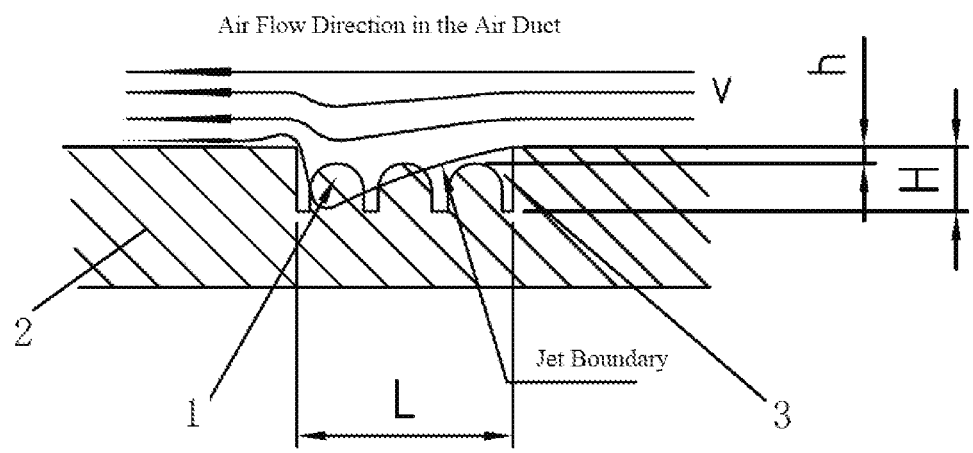
FIG. 1 is a schematic view showing a pit structure and a jet boundary according to the present invention.

Numerals in the drawings: 1, optical device, 2, rotor, 3, pit.

DETAILED DESCRIPTION OF THE INVENTION

The present invention will now be described in further detail with reference to the accompanying drawings and embodiments.

Embodiment

Figure 2:
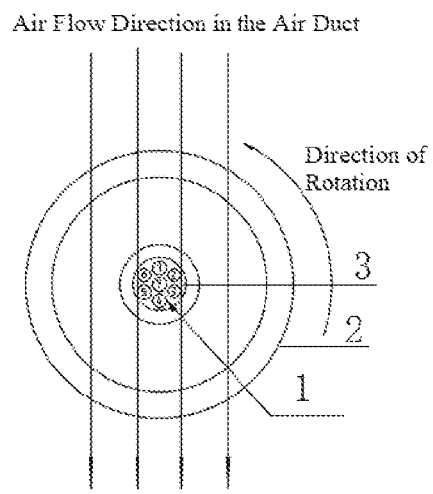
FIG. 2 is a top view of an optical device and air flow direction of the present invention.
Figure 3:
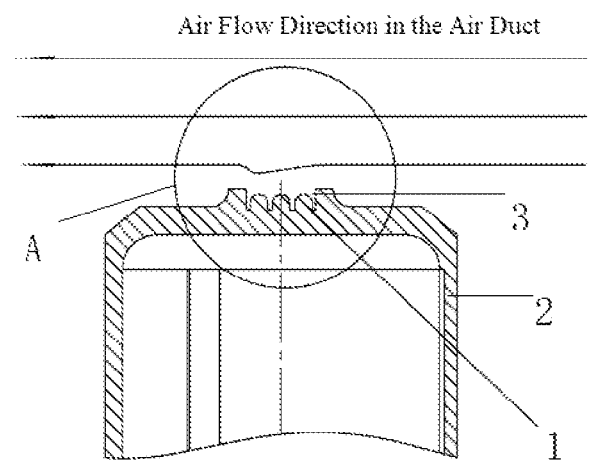
FIG. 3 is a side view of an optical device and air flow direction of the present invention.

As shown in FIGS. 1-3, in a positive and negative wind pressure automatic cleaning method for an optical device, an optical device 1 positioned in a pit structure at the end of a rotor is placed in an air inlet duct. When a generator rotor rotates, a fan positioned on the generator rotor continuously sends airflow into the air inlet duct, and the rotation plane of the end of the rotor is parallel to the flow direction of the airflow;

when the airflow passes through the edge of the pit structure at the end of the rotor, a jet effect is formed; due to the entrainment of the jet, the air which is still on the leeside is carried away by the entrainment; along with the addition of new air, the jet boundary diffuses outwards in the pit structure, forming one approximately triangular negative pressure area; the edge of the jet boundary diffuses to the top plane of the optical device; air in an area outside the jet boundary in the pit structure is carried away by the entrainment to form a relative negative pressure area, and the area inside the jet boundary is a relative positive pressure area;

when the rotor rotates at a high speed, for the same optical device, the high speed alternately exists in a negative pressure area and a positive pressure area; the force direction of the dust particles on the surface of the optical device continuously and alternately changes positively and negatively at high speed, so that the dust particles are caused to vibrate and are carried away by the airflow, thereby realizing automatic cleaning.

The wind temperature, the wind direction, the air volume and the wind speed of the air inlet duct are stable, and parallel stable airflow is formed. The optical device is positioned in the pit structure at the end of the rotor, and the top of the edge of the pit structure is higher than the top of the optical device. When the airflow velocity v is 6 m/s≤v≤15 m/s, and the pit structure depth H, the pit structure diameter L and the distance h between the pit structure edge and the optical device plane should meet the following conditions: H≥h and H≥0.0932L, 0.055L≤h≤0.284L. Infrared rays or visible rays of the optical device are emitted outwards from the end along the central axis direction.

The automatic cleaning is realized by utilizing fast-flowing air in parallel directions to form alternating positive and negative wind pressure on the surface of the optical device in the pit structure of the rotatory component to cause dust particles to vibrate. During normal operation, the end of the rotor is arranged in the air inlet duct, the end face is parallel to the flow direction of the air, the air temperature, the air direction, the air volume and the wind speed are stable, the heat amount of a product is small, the influence on the air temperature can be neglected, the size of the end of the product is small relative to the size of the air duct, and the influence on the air flow direction and flow rate of the main air duct at the end of the product can also be ignored.

Figure 4:
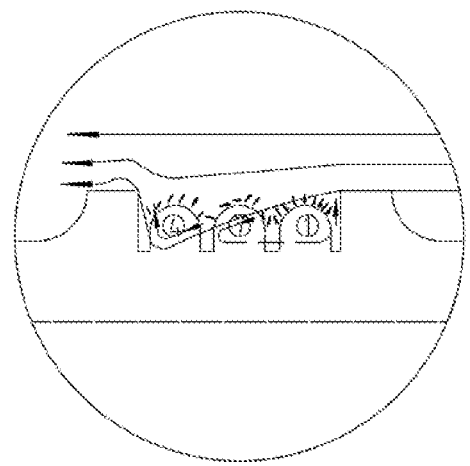
FIG. 4 is an enlarged view 1 of A in FIG. 3.
Figure 5:
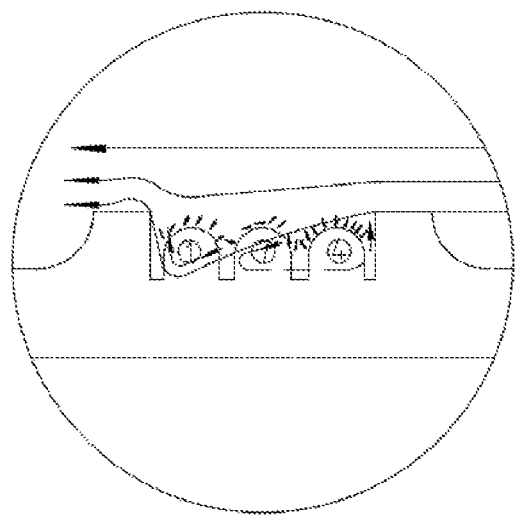
FIG. 5 is an enlarged view 2 of A in FIG. 3.

The end of the metal shell of the wireless rotary rotor grounding detection apparatus is provided with a pit structure, the optical device is placed in the pit, and the edge of the metal shell is higher than the top of the optical device to protect the optical device from being mechanically damaged. The air flow direction is parallel to the plane of the top part of the optical device. When the airflow flows through the edge of the pit structure, jet entrainment is generated and static air on the leeside is entrained by the airflow entrainment to form a negative pressure area. Due to the addition of new airflow, the airflow mixing boundary begins to diffuse into the pit structure and reaches the plane of the top part of the optical device in the pit structure. After passing the distance, the airflow is directly blown on the top surface of the optical device, forming a positive pressure area. The negative pressure area is triangular (see FIG. 1). The positive pressure area is arranged on the outer side of the triangle, namely the jet boundary. When the rotor rotates, the negative pressure area and the positive pressure area alternately exist for the same optical device, and the force on the dust particles on the surface of the optical device also changes alternately. For the convenience of description, 7 optical devices are numbered as shown in FIG. 2. At a certain moment in normal operation, the optical device is positioned under a force as shown in FIG. 4. The optical device ① is in a negative pressure area, and at the moment the force on the dust particles on the surface of the optical device is to suck outward. The optical device ④ is in a positive pressure area, and the force on the dust particles on the surface of the optical device is mainly to press towards the surface of the optical device. The optical device ⑦ is in the middle, and the force direction of the dust particles on the windward side on the right half of the surface of the optical device is to press towards the surface. The force direction of the dust particles on the leeside is outward suction, and the main force direction of the dust particles on the left half of the surface is outward suction. When the rotor rotates 180° around the central axis, the position and the force direction of the rotor are shown in FIG. 5. The optical device ① originally in the negative pressure area is turned to a positive pressure area, and the force direction of dust particles on the surface is changed from outward suction to inward pressure. The optical device ④ originally in the positive pressure area is turned to a negative pressure area, and the force direction of the dust particles on the surface is changed from inward pressure to outward suction. Because of the 180° rotation, the windward side and leeside of the optical device ⑦ in FIG. 5 are also different from those in FIG. 4.

According to the alternating reciprocating motion, dust particles on the surface of the optical device are forced to do reciprocating vibration motion, so that the dust particles are entrained to be carried away under the action of the airflow. The surface of the optical device can be kept clean for a long time, and shutting down and manual wiping cleaning are not needed.

The invention claimed is:

1. A positive and negative wind pressure automatic cleaning method for an optical device, wherein an optical device positioned in a pit structure at an end of a rotor is positioned in an air inlet duct, and when a generator rotor rotates, a fan positioned on the generator rotor continuously sends airflow into the air inlet duct, and a rotation plane of the end of the rotor is parallel to a flow direction of the airflow;

when the airflow passes through an edge of the pit structure at the end of the rotor, a jet effect is formed; due to entrainment of a jet, air which is still on a leeside is carried away by the entrainment; along with an addition of new air, a jet boundary diffuses outwards in the pit structure, forming one approximately triangular negative pressure area; an edge of the jet boundary diffuses to a top plane of the optical device; air in an area outside the jet boundary in the pit structure is carried away by the entrainment to form a relative negative pressure area, and an area inside the jet boundary is a relative positive pressure area;

when the rotor rotates at a sufficiently high speed, for the same optical device, a negative pressure area and a positive pressure area alternately exist; a force direction of dust particles on a surface of the optical device continuously and alternately changes positively and negatively at the sufficiently high speed, so that the dust particles are caused to vibrate and are carried away by the airflow, thereby realizing automatic cleaning.

2. The positive and negative wind pressure automatic cleaning method for an optical device according to claim 1, wherein a wind temperature, wind direction, air volume and wind speed of the air inlet duct are stable.

3. The positive and negative wind pressure automatic cleaning method for an optical device according to claim 1, wherein the optical device is positioned in the pit structure at the end of the rotor, and a top of an edge of the pit structure is higher than a top of the optical device.

4. The positive and negative wind pressure automatic cleaning method for an optical device according to claim 1, wherein when an airflow velocity v is 6 m/s≤v≤15 m/s, and a pit structure depth H, a pit structure diameter L and a distance h between the edge of the pit structure and an optical device plane meets the following conditions: H≤h and H≤0.0932L, and 0.055L≤h≤0.284L.

5. The positive and negative wind pressure automatic cleaning method for an optical device according to claim 1, wherein infrared rays or visible rays of the optical device are emitted outwards from an end of the optical device along a central axis direction.

\* \* \* \* \*